United States Patent
Date et al.

(10) Patent No.: US 9,315,926 B2
(45) Date of Patent: Apr. 19, 2016

(54) STRETCH FABRIC

(71) Applicants: Toray Industries, Inc., Tokyo (JP); Toyota Jidosha Kabushiki Kaisha, Toyota (JP)

(72) Inventors: Hiroaki Date, Otsu (JP); Hiroshi Tsuchikura, Otsu (JP); Ryosuke Yamao, Otsu (JP); Shin Maezawa, Toyota (JP)

(73) Assignees: Toray Industries, Inc. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 14/397,000

(22) PCT Filed: Apr. 23, 2013

(86) PCT No.: PCT/JP2013/061821
§ 371 (c)(1),
(2) Date: Oct. 24, 2014

(87) PCT Pub. No.: WO2013/161779
PCT Pub. Date: Oct. 31, 2013

(65) Prior Publication Data
US 2015/0111451 A1 Apr. 23, 2015

(30) Foreign Application Priority Data

Apr. 25, 2012 (JP) ................. 2012-099723

(51) Int. Cl.
*B60N 2/58* (2006.01)
*D03D 15/08* (2006.01)
(Continued)

(52) U.S. Cl.
CPC *D03D 15/08* (2013.01); *B60N 2/58* (2013.01); *D03D 15/0027* (2013.01); *D01F 6/86* (2013.01);
(Continued)

(58) Field of Classification Search
CPC ... D03D 15/0027; D03D 15/08; D03D 17/00; B60N 2/00
USPC .......................... 442/203, 209, 213, 216, 218
See application file for complete search history.

(56) References Cited

U.S. PATENT DOCUMENTS

| | | | |
|---|---|---|---|
| 2,804,099 A | 8/1957 | Sherman | |
| 8,012,893 B1 | 9/2011 | Liebe | |
| 2006/0128243 A1* | 6/2006 | Kong et al. | ................... 442/182 |

FOREIGN PATENT DOCUMENTS

| | | |
|---|---|---|
| DE | 20 2009 005 804 U1 | 7/2009 |
| JP | 2001-159052 | 6/2001 |

(Continued)

OTHER PUBLICATIONS

Adanur, Sabit. Wellington Sears Handbook of Industrial Textiles. Technomic Publishing Co. INC., Lancaster, PA. 1995. pp. 627-628.*

(Continued)

*Primary Examiner* — Jenna Johnson
(74) *Attorney, Agent, or Firm* — DLA Piper LLP (US)

(57) ABSTRACT

A stretch fabric in which one yarn of warp and weft yarns is obtained from an inelastic yarn having a crimp ratio of 5% to 30% and at least a portion of the other is obtained from an elastic yarn having a crimp ratio of 0% to 5%, and characterized in that the extension percentage in a load direction along the former yarn is 5% to 30% when weighted with a 340N/5 cm load in the load direction. The stretch fabric has excellent cushioning properties and fatigue resistance, and can be used as a material that saves space and combines holding properties with cushioning properties.

4 Claims, 1 Drawing Sheet

(51) Int. Cl.
  *D03D 17/00*  (2006.01)
  *D03D 15/00*  (2006.01)
  *D01F 6/86*  (2006.01)

(52) U.S. Cl.
  CPC ............ *D03D 17/00* (2013.01); *D10B 2331/04* (2013.01); *D10B 2331/10* (2013.01); *D10B 2331/301* (2013.01); *D10B 2401/04* (2013.01); *D10B 2401/061* (2013.01); *D10B 2401/063* (2013.01); *D10B 2505/12* (2013.01); *Y10T 442/3024* (2015.04)

(56) References Cited

FOREIGN PATENT DOCUMENTS

| | | |
|---|---|---|
| JP | 2002-129448 | 5/2002 |
| JP | 2005-120515 | 5/2005 |
| JP | 2006-132047 | 5/2006 |
| JP | 2007-117537 | 5/2007 |

OTHER PUBLICATIONS

Supplementary European Search Report dated Jan. 30, 2015 of corresponding European Application No. 13781286.3.

* cited by examiner

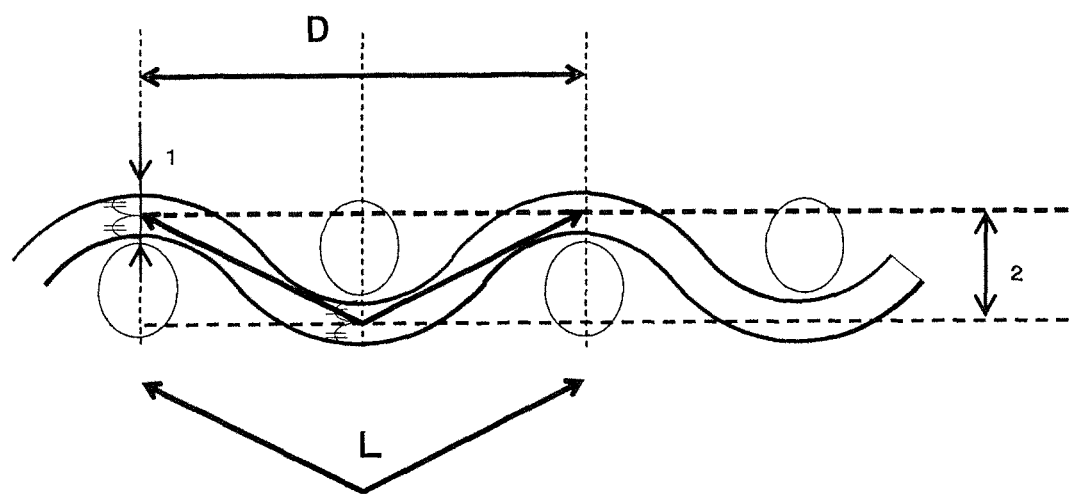

STRETCH FABRIC

TECHNICAL FIELD

This disclosure relates to a stretch fabric having excellent cushioning properties and can be used as a space-saving material serving both as a holding material and a cushioning material.

BACKGROUND

Recently, various chairs of which body-supporting surface is made of a fabric mesh sheet such as knitted cloth and woven cloth so that good cushioning properties are achieved without urethane foam or the like have been sold in the open market while new configurations have been suggested as disclosed in JP 2007-117537-A and JP 2006-132047-A. JP 2007-117537-A discloses a chair structure of which a backrest is made of sheet material provided with bag-formed hems into which core members are inserted to make a frame supporting itself. JP2006-132047-A discloses another seat structure of which the seating face is made of warp knit knitted by a double raschel knitting machine. Further, an office chair and a vehicle seat, made from a mesh fabric containing a sheet elastomer of fiber having high extensibility such as elastomer fiber, have been suggested.

Furthermore, JP 2001-159052-A discloses a cushion material made from a fabric provided with elastomer fiber weft yarn and polyester fiber warp yarn to achieve both good extensibility and strength.

From such viewpoints, desired are an advanced space-saving material having excellent cushioning properties and proper amount of sinking.

As to materials made with a large amount of conventional elastomer as shown in JP 2007-117537-A or JP 2006-132047-A, stability or comfort is not secured because the materials might stretch too much when unexpectedly high load is applied, even though high extensibility is achieved.

The material disclosed in JP 2001-159052-A has only poor stretch properties along polyester fibers so that a proper amount of sinking cannot be achieved. Further, unexpectedly high load might cause a stress to deform the elastomer over the yield point although it extends well along the elastomers.

Furthermore, the fabric has unidirectionally high extensibility and, therefore, if the warp and weft directions of the fabric are fixed the extensibility might be poor.

Accordingly, it could be helpful to provide a stretch fabric for seats, which is excellent in cushioning properties and is used as a space-saving material serving both as a holding material and a cushioning material.

SUMMARY

We provide a stretch fabric in which one yarn of warp and weft yarns comprises an inelastic yarn having a crimp ratio of 5% to 30% and at least a portion of another yarn of warp and weft yarns comprises an elastic yarn having a crimp ratio of 0% to 5%, wherein an extension percentage in a direction of applying a load is 5% to 30% when the load is applied at 340N/5 cm in parallel to the one yarn. Namely, if a "warp yarn" comprises the inelastic yarn having a crimp ratio of 5% to 30%, a stretch fabric is a stretch fabric in which at least a portion of a "weft yarn" is an elastic yarn having a crimp ratio of 0% to 5%, wherein an extension percentage in a direction of applying a load is 5% to 30% when the load is applied at 340N/5 cm in parallel to the "warp yarn".

It is preferable that the elastic yarn is made of a polyester-based elastomer.

It is preferable that the elastic yarn comprises a core component and a sheath component of monofilament having fusion-bonded intersections, wherein the core component is made of a polyester-based elastomer having a melting point of 190° C. to 250° C. and the sheath component is made of a polyester-based elastomer having a melting point of 140° C. to 190° C.

It is preferable that the extension percentage in the direction of applying the load is 8% to 20%.

It is preferable that a residual strain in the direction of applying the load is 3% or less after being extended at a constant speed as repeating a loading and an unloading 300,000 times at 340N/5 cm.

We also provide a seat comprising the stretch fabric at least in a part.

The stretch fabric has good extensibility along the inelastic yarn and is suitably used for seats. Its breathability and lightness are advantageous to be spread to various use from a viewpoint of energy saving.

The stretch fabric is specifically suitable as a cushion material for seats, though it is also applicable to various purposes requiring cushioning properties. It is possible that its own cushioning function is given to office chairs or vehicle seats. Alternatively, the stretch fabric can be a part composing a seat structure combined with a conventional cushion material.

BRIEF DESCRIPTION OF THE DRAWINGS

FIG. 1 is a section view of a fabric to explain a measuring method of crimp ratio of yarns.

EXPLANATION OF SYMBOLS

1: yarn diameter
2: crimp height
D: distance [mm] between centers of adjacent weft yarns or warp yarns
L: axis length of warp or weft yarn

DETAILED DESCRIPTION

We provide a stretch fabric in which one yarn of warp and weft yarns is an inelastic yarn having a crimp ratio of 5% to 30% and at least a portion of the other yarn thereof is an elastic yarn having a crimp ratio of 0% to 5%, wherein an extension percentage along the inelastic yarn (in a warp or weft direction depending on whether the warp yarn or weft yarn is inelastic, respectively) is 5% to 30% when a load is applied at 340N/5 cm along the inelastic yarn.

In the stretch fabric, the one yarn of warp and weft yarns is the inelastic yarn while at least a portion of the other is an elastic yarn as described above. The above-described configuration of the crimped inelastic yarn used as the one yarn of warp and weft yarns can improve a fabric strength, extensibility and durability in repetitive use. The above-described configuration of crimped elastic yarn used as at least a portion of the other could improve an extension easiness along the inelastic yarn of fabric and a good recovery after extending.

A material such as thermoplastic elastomer which is excellent in extensibility and recovery can be used as the elastic yarn. The elastic yarn may be a yarn having high extensibility and recovery like a yarn of elastomer. It is preferably a yarn made of polyether-based elastomer, polysulfide-based elastomer or polyurethane-based elastomer.

The inelastic yarn is a yarn other than the elastic yarn and may be made of polyethylene terephthalate, polybutylene terephthalate, polypropylene terephthalate or those copolymers, polyamide or the like, or alternatively may be a metal fiber. It is preferable to be a yarn having a heat-set ability.

The stretch fabric is configured, such that the inelastic yarn of the one yarn of warp and weft yarns has a crimp ratio of 5% to 30% and the elastic yarn composing at least a portion of the other has a crimp ratio of 0% to 5%.

The crimp ratio less than 5% of the inelastic yarn of the one yarn of warp and weft yarns might not give sufficient extensibility along the inelastic yarn of the stretch fabric. The crimp ratio more than 30% of the inelastic yarn might have too much amount of "sinking" when used in seats.

It is preferable that the yarn of the other has a crimp ratio of less than or equal to 5%. The crimp ratio more than 5% tends to increase resistance of the elastic yarn in the quadratic curve as the increased load applied along the inelastic yarn decreases the crimp of the inelastic yarn because much of the resistance of an elastic yarn of the other works as tensile stress when the fabric is extended along the inelastic yarn.

From a viewpoint of comfortable cushion material, it is preferable that the inelastic yarn of the fabric warp or weft yarn has a crimp ratio of 10% to 15% and that the other elastic yarn has a crimp ratio of 0% to 4%.

To produce a fabric having a crimp ratio of 5% to 30% in the inelastic yarn of the one yarn of warp and weft yarns as well as another crimp ratio of 0% to 5% in the elastic yarn, a fabric cover factor adjustment or a heat-set process can be performed to tense and relax along the inelastic yarn and the elastic yarn. The heat-set process can be performed to tense along the elastic yarn and relax along the inelastic yarn to produce a fabric having a high crimp ratio of the inelastic yarn only.

The fabric is configured to have an extension percentage along the inelastic yarn of 5% to 30% when a load is applied at 340N/5 cm along the inelastic yarn.

The load applied at 340N/5 cm is regarded as a normal load applied by a sitting person and corresponds to the amount of sinking exhibited in conventional seats. In the fabric, it is preferable that the extension percentage along the inelastic yarn is 8% to 20% when a load is applied at 340N/5 cm in parallel to the inelastic yarn.

It is preferable that the stretch fabric is configured such that the inelastic yarn of the warp or weft yarn of the fabric is parallel to a direction in which a load is greatly applied in normal use. If an unexpectedly great load is applied along the elastic yarn of the other having a high stretch, too much residual strain might be generated in the extended cloth. In contrast, if a great load is designed to be applied along the inelastic yarn, desirable extensible materials can be produced without residual strains. It is preferable that the extension percentage along the inelastic yarn is 10% to 30% when a load is applied at 735N/5 cm along the inelastic yarn.

Such a material which has a sufficient extensibility in normal use and limits the extension under abnormally high load can be made from a fabric in which the inelastic yarn of the one yarn of warp and weft yarns has a crimp ratio of 5% to 30% and the elastic yarn of the other has a crimp ratio of 0% to 5%. The crimp ratio of the inelastic yarn within the above-described range can limit the extension under a load applied to the fully-extended fabric crimp and achieve proper extensibility while the fabric crimp is extended with a normal load along the inelastic yarn. In contrast, the material can be unlimitedly extended under abnormally high load applied because a high fabric extensibility along an elastic yarn derived from a high extensibility of the elastic yarn in its own is maintained after the fabric crimp is fully-extended.

In the stretch fabric, it is preferable that the inelastic yarn of the one yarn of warp and weft yarns is a polyester inelastic yarn. The polyester inelastic yarn can achieve a high strength and durability in repetitive use as maintaining the crimp formation of the inelastic yarn. Further, the polyester inelastic yarn has a melting point sufficiently higher than that of a portion to be fusion-bonded on the other elastic yarn. The polyester inelastic yarn may be a twisted yarn, false-twisted yarn or a mixed yarn with another polyester, and preferably comprises long fibers from viewpoints of cost, durability and strength.

It is preferable that the elastic yarn used as a yarn other than the warp or weft yarn used as the inelastic yarn is an elastic yarn of polyester-based elastomer. The elastic yarn of polyester-based elastomer can give a high extensibility along the inelastic yarn of fabric together with a good recovery after the fabric is extended. The polyester-based elastomer has a comparatively high melting point and a proper extensibility to have a good spinnability in a composite spinning process or the like.

To achieve strength and recovery after extending which are required as a fabric for seats, it is preferable that the polyester-based elastomer is an aromatic polyester made from an aromatic dicarboxylic acid and glycol as main raw materials. It is more preferable that the polyester-based elastomer is an elastic yarn of polyester prepared by copolymerizing polybutylene terephthalate with polytetramethylene glycol to improve the recovery after extending.

It is preferable that the elastic yarn of polyester-based elastomer comprises a core component and a sheath component, wherein the core component is made of a polyester-based elastomer having a higher melting point of 190° C. to 250° C. and the sheath component is made of a polyester-based elastomer having a lower melting point of 140° C. to 190° C. The polyester-based elastomer having a core-sheath structure can make it possible that a fusion-bonding process using the melting point difference is performed as keeping elastomer characteristics such as fiber strength and elastic modulus.

The melting points of the core component and the sheath component can be derived from heat-set properties of polyester fiber yarn and elastomer which compose a union cloth. The heat-set temperature of 160° C. to 210° C. is required to maintain a desirable crimp condition of the heat-set polyester fiber of union cloth. The sheath component should be fusion-bonded at the heat-set temperature while the core component maintains elastomer characteristics at the same time. That means it is preferable that the elastomer core component isn't fusion-bonded at the same time when the sheath component is fusion-bonded. From viewpoints of the heat-set temperature of the polyester yarn, the fusion-bonding of the elastomer sheath component and the maintenance of the elastomer core component characteristics, it is preferable that the core component has a melting point of 190° C. to 250° C. and the sheath component has a melting point of 140° C. to 190° C.

It is preferable that the elastic yarn is made of two kinds or more of polyester-based elastomer having different melting points. The heat-set process can melt a polyether ester-based elastomer having the lower melting point to be solidified again while a polyester-based elastomer having the higher melting point maintains the elastic modulus, so that fabric intersections are fixed. If the elastic yarn of polyester-based elastomers having different melting points is subjected to the heat-set process, a strong stitch fixation is achieved without deteriorating the strength and elastic recovery of fabric because the flexible polyester-based elastomer which has the lower melting point and excellent elastic recovery is fusion-bonded at the intersection of warp and weft yarns of fabric or intersection of yarns composing the fabric. From viewpoints of durability and adhesiveness in the heat-set process, it is preferable that a melting point difference between the core component and the sheath component is 30° C. or more.

It is preferable that the sheath component of the polyester-based elastomer is fusion-bonded. Such a configuration is advantageous to the fabric durability as a seat material and to the handling ability of fabric in the higher order.

It is more preferable that the elastic yarn is a monofilament. Even a multifilament elastic yarn is acceptable because of having mechanical properties such as sufficient recovery after extending. However, it might be changed in fiber bundle diameter when loaded because the spring characteristics are changed by being tensed along the inelastic yarn composing the stretch fabric depending on the elastic fiber diameter of the one yarn of warp and weft yarns. The monofilament elastic yarn can be easily desirably designed. Even a multifilament can be used if its fiber diameter hardly changes like a multifilament-twisted yarn, for example. However, it might increase the cost of material. The fiber diameter of fiber bundle is a factor considered together with bending or tensile characteristics of polyester-based elastomer polymer. It is preferable that the monofilament has a monofilament fineness of 100 dtex to 6,000 dtex. If the monofilament fineness is less than 100 dtex, the monofilament made of the same polymer can be bent easily so that the extended fabric tends to be extended even with a low load while it doesn't tend to be extended with a high load. Therefore, sufficient durability cannot be obtained. If the monofilament fineness is more than 6,000 dtex, it cannot be extended easily even when the fabric is extended and the fabric being produced cannot be handled easily. It is preferable that the monofilament has a fineness of 300 dtex to 3,000 dtex. The thinner the monofilament of the elastic yarn is, the smaller crimp the inelastic yarn of the warp or weft yarn of fabric has to reduce the extensibility along the fabric inelastic yarn under a certain load. In contrast, the thicker the monofilament, the greater crimp the inelastic yarn has in the certain load to increase the extensibility along the inelastic yarn. This is another reason why the above-described range of fineness is preferable.

There is a deep relationship between the extensibility or repulsion and the fiber diameter of seats. If the fabric is extended along the inelastic yarn of the warp or weft yarn, a proper extension can be achieved by extending the crimp of the inelastic yarn. At the same time, a force is applied to the other elastic yarn in a direction to increase the crimp. That means the extension along the fabric inelastic yarn deeply relates to a bending resistance and a tensile resistance of other elastic yarn. The flexible and extensible polymer of elastic yarn makes a thin fiber diameter and therefore provides a seat which has less repulsion and a great amount of sinking even under a low load. To achieve proper extensibility and repulsion of fabric, it is possible that the bending characteristics and tensile resistance of polymer of elastic yarn, and fiber diameter can be adjusted to design a proper range. Specifically, it is preferable that the elastic yarn is made of a fiber having a stress at 20% extension percentage of 0.1 cN/dtex to 0.8 cN/dtex so that an extension percentage is 5% to 30% when loaded at 340N/5 cm along the fabric inelastic yarn.

Further, the extensibility and repulsion of fabric deeply relate to a cover factor of the inelastic yarn of the one yarn of warp and weft yarns and a cover factor of the elastic yarn of the other. It is preferable that a cover factor of the inelastic yarn is 600 to 1,300 and a cover factor of the elastic yarn is 800 to 1,800. If the cover factor of the inelastic yarn is less than 600, the fabric strength tends to be insufficient. If the cover factor is more than 1,300, the extensibility along the inelastic yarn of fabric tends to be insufficient. If the cover factor of the elastic yarn is less than 800, the strength tends to be insufficient like the inelastic yarn. If the cover factor is more than 1,800, the extensibility along the inelastic yarn of fabric may be good but the runnability might deteriorate in a weaving process.

The cover factor is calculated by the following formula.

$$(\text{Cover factor}) = (\text{Density [piece/inch]}) \times (\text{Fineness [denier]})^{1/2}$$

The polyester inelastic yarn may be unprocessed yarn, twisted yarn, false-twisted yarn or combination thereof. Other materials can be mixed thereto. Further, it may be a dyed yarn, monofilament or yarn of copolymer made by copolymerizing polyester with another polymer. From a viewpoint of fabric strength, it is preferable that the polyester fiber yarn has a high strength of 5.0 cN/dtex or more. It is preferable that the strength is higher, and is 5.0 cN/dtex to 15.0 cN/dtex practically. It is preferable that the multifilament is a twisted yarn to improve the fabric extensibility by utilizing polyester crimps of the inelastic yarn to decrease collapsed yarns at fabric intersections. It is preferable that the twisted yarn is designed to have the number of twists corresponding to a twist coefficient of 2,000 to 30,000 from viewpoints of weaving, quality and handling in the higher order. From a viewpoint of production cost derived from mass productivity in a twisting process and handling, it is more preferable that the twist coefficient is 2,000 to 30,000.

The twist coefficient can be calculated with the following formula.

$$(\text{Twist coefficient}) = (\text{The number of twists [T/m]}) \times (\text{Fineness [denier]})^{1/2}$$

It is preferable that the melting point of the polyester-based elastomer having lower melting point is 40° C. or higher from viewpoints of spinnability as well as weaving-knitting abilities. From a viewpoint of target use of the elastic yarn, it is preferable to use a yarn having a melting point lower by at least 30° C. than that of the polyester-based elastomer having the higher melting point. It is practically preferable that the polyester-based elastomer having the higher melting point and the polyester-based elastomer having the lower melting point are contained in a weight ratio of 90/10 to 40/60, preferably 80/20 to 70/30.

It is preferable that the heat-set process is performed at a temperature between a temperature lower by at least 10° C. than the melting point of the elastic yarn having the higher melting point and a temperature higher by at least 10° C. than the melting point of the elastic yarn having the lower melting point. The fabric can be subjected to the heat-set process to firmly bond the yarn with another yarn contacting in the fabric structure. It is preferable that the melting point of the polyester yarn of the fabric is more than or equal to the melting point of the polyester-based elastomer having the higher melting point.

It is preferable that a maximum value of dry-heat shrinkage stress of the elastic yarn of polyester-based elastomer is 0.05 cN/dtex to 2.00 cN/dtex at maximum in a range of 150° C. to 210° C. Such a configuration can increase the crimp height of the inelastic yarn of the one yarn of warp and weft yarns of the stretch fabric in the heat-set process, by utilizing the shrinkage force of the other elastic yarn at the heat-set temperature. A shrinkage stress less than 0.05 cN/dtex can have a poor processability although the cloth can be stretched along the elastic yarn to increase the crimp height of the inelastic yarn. If the shrinkage stress is more than 2.00 cN/dtex, the shrinkage force may increase and exert a great load on a heat-set machine.

From a viewpoint of durability, it is preferable that a residual strain along the inelastic yarn is 3% or less after being extended to deform at a constant speed as repeating loading up to 340N/5 cm and unloading 300,000 times. A residual strain more than 3% may make a user realize deterioration of seating properties such as sinking amount and repulsion of seat through long term usage. From viewpoints of quality and performance, it is more preferable that the residual strain is 1% or less.

In the stretch fabric, the elastic yarn used as warp or weft yarn can be made of a polyester-based elastomer yarn to make the material extension percentage along the inelastic yarn used as the other yarn higher. Unless a high extensibility is required, the polyester-based elastomer yarn which is an elastic yarn may be united with another yarn in the warp or weft yarn used as the elastic yarn. The another yarn may be a fiber yarn of polyester, polyamide, polyphenylene sulfide or the like. From a viewpoint of thermal resistance, the polyphenylene sulfide yarn is preferably employed for a purpose requiring the thermal resistance in part.

It is possible that the elastic yarn of warp or weft yarn is partially made from the polyester-based elastomer with another yarn united. The elastic yarn may have a proportion of 50 mass % or more in the elastic warp or weft yarn. A part made of elastomer fibers exhibits higher extensibility if many pieces of the elastic yarns and the inelastic yarns are woven continuously along the elastic yarn of warp or weft yarn compared to when one or two pieces of the elastic yarns or the inelastic yarns are woven in turns. Thus, many pieces can be continuously woven to make the fabric have a partially high stretch. Therefore, fabrics can be designed to have desirable stretch lengths depending on purposes to make a fabric having a stretch performance and another performance at the same time. For example, an extensible fabric can be produced such that both ends of cloth have high thermal resistance. It is possible that the stretch performance is accompanied with other characteristics such as abrasion resistance, chemical resistance, high strength and adhesiveness (adhesiveness between fabric and material to compose a fabric member).

The stretch fabric is applicable to a vehicle seat material, a shoe leather material, a bag material, a sport ball material for soccer or volleyball, adhesive tape, base cloth of nonwoven fabric, interior material, vehicle or house interior material, civil engineering material or the like.

The fabric structure of the stretch fabric may be plain woven, twill woven, satin woven or their combined structure such as double structure, depending on the purpose. Specifically, the plain woven structure having many intersections tends to enhance extensibility along the inelastic yarn so that frays can be easily prevented to improve handling ability. Weaving method and weaving machines are not limited specifically and can be selected appropriately.

EXAMPLES

Next, the stretch fabric will be explained with reference to examples. Characteristic to be shown for Examples are determined as follows.
1. Crimp Ratio A sample (fabric) has been cut in parallel to an inelastic yarn or elastic yarn and attached to a sample stage in a non-tensile state. An enlarged image of the sample is taken. A crimp interval [mm] is measured from the distance and height of the crimp of inelastic yarn or elastic yarn. A distance between centers of adjacent elastic yarn or inelastic yarn is measured to calculate a crimp ratio (C) by the following formula. The measurement is performed for 5 parts of the sample to be averaged. (See FIG. 1)

Crimp ratio $(C)=(L/D-1)[\%]$ (L denotes crimp interval [mm] of inelastic yarn or elastic yarn; D denotes distance [mm] between centers of adjacent elastic yarn or inelastic yarn.)
2. Yarn Strength Elongation A yarn strength elongation is measured according to RS-L-1013 with a constant-speed extension type tester at 200 mm gripping interval and 200 mm/min tensile speed. 20 sets of the measurements are performed to be averaged. Also, a yarn stress at 20% extension is calculated from the measurement result.
3. Fabric Extension Percentage when Loaded at 340N/5 cm A fabric stretch rate is measured in the center of a circle having 300 mm diameter in the test piece with a constant-speed extension type tester at 200 mm gripping interval, 50 mm gripping width and 200 mm/min tensile speed according to RS-L-1096. 5 samples are measured to determine an elongation at 340N load to be averaged.
4. Fabric Tensile Modulus when Loaded at 340N/5 cm and 500N/5 cm A tensile load-strain curve is obtained from the measurement of the same kinds of samples with the above-described constant-speed extension type tester under the same measurement conditions. 5 samples are measured to obtain tangent line gradients in the obtained curves when loaded at 340N/5 cm and 500N/5 cm to be averaged.
5. Residual Strain A residual strain R after repetitive deformation along the inelastic yarn is determined with "SERVO PULSAR" (registered trademark) (made by Shimadzu Corporation) under the following conditions.
Measurement Condition
    Sample size: circle of 300 mm diameter
    Gripping interval: 200 mm, Gripping width: 50 mm
    Load: 340N/5 cm
    Cycles of repetitive deformation: 300,000 times
Calculation Method of Residual Strain After the repetitive deformation, a residual strain (R) is calculated by the following formula.

$R=(L1-L0)/L0\times 100$

L0: sample length before repetitive deformation; L1: sample length after repetitive deformation
6. Fabric Extension Percentage when Loaded at 735N/5 cm A fabric stretch rate is measured in the center of a circle having 300 mm diameter in the test piece according to JIS-L-1096 with a constant-speed extension type tester at 200 mm gripping interval, 50 mm gripping width and 200 mm/min tensile speed. 5 samples are measured to determine an elongation at 735N load to be averaged.
7. Dry-Heat Shrinkage Stress 10 cm of sample filament yarn is collected, of which both ends connect to form a loop. The loop is subjected to a dry-heat process to be gradually heated from room temperature to 230° C. with a thermal shrinkage stress tester made by Kanebo Company under 0.03 cN/dtex load. Maximum shrinkage stress [cN] is divided by a total yarn fineness [dtex] to obtain a shrinkage stress [cN/dtex] per monofilament fineness.

Example 1

Polyethylene terephthalate as an aromatic polyester and poly(butylene glycol/polytetramethylene ether glycol)

terephthalate ("HYTREL" (registered trademark) 6347 made by Du Pont-Toray Co., Ltd. and "HYTREL" (registered trademark) 4056) as a thermoplastic polyester-based elastomer were dried up. The dried pellets were blended and supplied to an extruder, and then melt blended to prepare pellets.

Then, a monofilament elastic yarn of 700 dtex was made from the polyester-based elastomer ("HYTREL" (registered trademark) 6347: melting point 215° C.) as a core component and the polyester-based elastomer ("HYTREL" (registered trademark) 4056: melting point 153° C.) as a sheath component, in which the weight proportion of core/sheath was 70/30. The elastic yarn was used as a weft yarn. A warp yarn was a loosely-twisted yarn by 200 T/m of polyester multifilament yarn (high tenacity polyester made by Toray Industries, Inc.) having total fineness of 1670 dtex-288 filament made of polyethylene terephthalate as an aromatic polyester described above. A plain woven fabric was prepared such that the weft density was 33 pieces/inch and the warp density was 25 pieces/inch. Thus obtained fabric was subjected to a heat-set process at 180° C. for 2 min as overfeeding by 20% only in the warp direction so that the fabric had warp density of 25 pieces/inch and weft density of 47 pieces/inch.

It was confirmed that the heat-set fabric had polyester-based elastomer of sheath component solidified to attach to the intersection between the warp yarn and weft yarn of fabric. The fabric had good extensibility in the warp direction as well as a comfortable seating performance in a seat prepared with the fabric. The results are shown in Table 1.

Example 2

Similarly, a plain woven fabric having a border pattern (weft stripe) was prepared with the polyester used in Example 1 as a warp yarn and the elastic yarn of polyester-based elastomer as a weft yarn which partially contains polyphenylene sulfide (PPS) fiber of 440 dtex fineness-100 f ("TORCON" (registered trademark) made by Toray Industries, Inc.). In the fabric, the weft yarn had 4/1 of length proportion of a region made of elastic yarn of polyester-based elastomer to another region made of the PPS fiber. Thus obtained gray fabric was subjected to the heat-set process in the same way as Example 1 so that warp density was 23 pieces/inch and weft density was 45 pieces/inch. Characteristics of the fabric are shown in Table 1. The obtained fabric had good extensibility in the warp direction without deteriorating physical properties even when bonded to resin material at a high temperature.

Example 3

A monofilament of 2170 dtex fineness was prepared in the same way as Example 1, except that the core component of elastic yarn of polyester-based elastomer was "HYTREL" (registered trademark) 4767 having melting point of 199° C. Such an elastic yarn was used as a weft yarn while the same polyester as Example 1 was used as a warp yarn to prepare a plain woven fabric having warp density of 26 pieces/inch and weft density of 26 pieces/inch, which was subjected to the same heat-set process as Example 1. Characteristics of the fabric are shown in Table 1. The obtained fabric having good stretch properties had little residual strain even after repetitive deformation.

Example 4

A monofilament of 2170 dtex fineness was prepared in the same way as Example 1, except that the core component of elastic yarn of polyester-based elastomer was "HYTREL" (registered trademark) 4767 having melting point of 199° C. Such an elastic yarn was used as a weft yarn while the same polyester as Example 1 was used as a warp yarn to prepare a twill woven fabric. Thus obtained fabric was subjected to a dry-heat-set process at 160° C. for 2 min as overfeeding by 23% only in the warp direction so that the fabric had warp density of 30 pieces/inch and weft density of 47 pieces/inch. Characteristics of the fabric are shown in Table 1.

TABLE 1

|  | Example 1 | Example 2 | Example 3 | Example 4 |
|---|---|---|---|---|
| Warp yarn | Polyester inelastic yarn | Polyester inelastic yarn | Polyester inelastic yarn | Polyester inelastic yarn |
| Weft yarn | Elastic yarn of elastomer | Elastic yarn of elastomer/PPS inelastic yarn | Elastic yarn of elastomer | Elastic yarn of elastomer |
| Warp crimp ratio | 11% | 14% | 12% | 14% |
| Weft crimp ratio | 4% | 2% | 2% | 3% |
| Extension percentage at load of 340 N/5 cm in warp direction | 13.2% | 10.8% | 15.0% | 10.9% |
| Extension percentage at load of 735 N/5 cm in warp direction | 19.5% | 16.5% | 22.4% | 17.4% |
| Residual strain at repetitive load of 310 N/5 cm | 1.0% | 1.4% | 0.6% | 0.9% |

Example 5

A monofilament of 570 dtex fineness was prepared in the same way as Example 1, except that the core component of elastic yarn of polyester-based elastomer was "HYTREL" (registered trademark) 7247 having melting point of 216° C. Such an elastic yarn was used as a weft yarn while the same polyester as Example 1 was used as a warp yarn to prepare a plain woven fabric having warp density of 30 pieces/inch and weft density of 52 pieces/inch by performing the same heat-set process as Example 1. Characteristics of the fabric are shown in Table 2. The obtained fabric had good stretch properties in the warp direction without deteriorating physical properties even when bonded to resin material at a high temperature.

TABLE 2

|  | Example 5 | Example 6 | Comparative example 1 | Comparative example 2 |
|---|---|---|---|---|
| Warp yarn | Polyester inelastic yarn | Polyester inelastic yarn | Polyester inelastic yarn | Polyester inelastic yarn |
| Weft yarn | Elastic yarn of elastomer | Elastic yarn of elastomer | Elastic yarn of elastomer | Polyester inelastic yarn |
| Warp crimp ratio | 13% | 6% | 5% | 11% |
| Weft crimp ratio | 2% | 1% | 10% | 10% |
| Extension percentage at load of 340 N/5 cm in warp direction | 11.6% | 6.7% | 4.2% | 2.4% |
| Extension percentage at load of 735 N/5 cm in warp direction | 19.8% | 15.5% | 11.4% | 6.6% |
| Residual strain at repetitive load of 340 N/5 cm | 0.8% | 2.7% | 2.8% | 6.1% |

Example 6

The same warp and weft yarns as Example 5 were used to prepare a plain woven fabric having warp density of 36 pieces/inch and weft density of 22 pieces/inch. Thus obtained fabric was subjected to a dry-heat-set process at 180° C. for 2 min as overfeeding by 10% only in the warp direction. Characteristics of the fabric are shown in Table 2.

Comparative Example 1

The same warp and weft yarns as Example 1 were used to prepare a plain woven fabric having warp density of 30 pieces/inch and weft density of 29 pieces/inch. Thus obtained fabric was subjected to the same dry-heat-set process as Example 1 at 180° C. for 2 min, as overfeeding by 0% in the warp direction and overfeeding by 18% in the weft direction. Characteristics of the fabric are shown in Table 2. The material had insufficient extensibility.

Comparative Example 2

The same polyester yarn as Example 1 was used as warp and weft yarns to prepare a plain woven fabric having warp density of 30 pieces/inch and weft density of 28 pieces/inch. Thus obtained fabric was subjected to a dry-heat-set process at 180° C. for 2 min as overfeeding by 7% in the warp and weft directions. Characteristics of the obtained fabric are shown in Table 2. The obtained fabric was poor in extensibility, handling and performance, while a cut fabric had distortion and slippage of yarn.

Example 7

The same warp and weft yarns as Example 4 were used to prepare a plain woven fabric. Thus obtained fabric was subjected to a dry-heat-set process at 160° C. for 2 min as overfeeding by 20% only in the warp direction so that the fabric had warp density of 27 pieces/inch and weft density of 31 pieces/inch. Characteristics of the fabric are shown in Table 3. The fabric had a great extensibility in the warp direction but a soft seating made a rather large amount of sinking in a seat prepared with the fabric.

Example 8

The same warp and weft yarns as Example 5 were used similarly to prepare a twill woven fabric. Thus obtained fabric was subjected to a dry-heat-set process at 180° C. for 2 min as overfeeding by 25% only in the warp direction so that the fabric had warp density of 30 pieces/inch and weft density of 84 pieces/inch. Characteristics of the fabric are shown in Table 3. The fabric was poor in extensibility in the warp direction with a slightly hard seating texture in a seat prepared with the fabric.

Comparative Example 3

The same polyester yarn as Example 1 was used as weft yarn and an elastic yarn of polyester-based elastomer was used as warp yarn to prepare a plain woven fabric having warp density of 30 pieces/inch and weft density of 28 pieces/inch. Thus obtained fabric was subjected to the same dry-heat-set process as Example 1 at 180° C. for 2 min, as overfeeding by 7% in the warp direction and overfeeding by 15% in the weft direction. Characteristics of the fabric are shown in Table 3. Although the fabric had a high extensibility in the warp direction, it had a low limit of the extension at 735N and therefore was poor in stability and comfortable seating.

TABLE 3

|  | Example 7 | Example 8 | Comparative example 3 |
|---|---|---|---|
| Warp yarn | Polyester inelastic yarn | Polyester inelastic yarn | Elastic yarn of elastomer |
| Weft yarn | Elastic yarn of elastomer | Elastic yarn of elastomer | Polyester inelastic yarn |
| Warp crimp ratio | 24% | 9% | 9% |
| Weft crimp ratio | 2% | 3% | 11% |
| Extension percentage at load of 340 N/5 cm in warp direction | 18.9% | 5.9% | 16% |
| Extension percentage at load of 735 N/5 cm in warp direction | 26.7% | 10.3% | 37.8% |
| Residual strain at repetitive load of 340 N/5 cm | 1.8% | 0.6% | 9.2% |

INDUSTRIAL APPLICATIONS

The stretch fabric is applicable to a vehicle seat material, a shoe leather material, a bag material, a sport ball material for soccer or volleyball, adhesive tape, base cloth of nonwoven fabric, interior material, vehicle or house interior material, civil engineering material or the like.

The invention claimed is:

1. A stretch fabric in which one yarn of warp and weft yarns comprises an inelastic yarn having a crimp ratio of 5% to 30% and at least a portion of another yarn of warp and weft yarns comprises an elastic yarn having a crimp ratio of 0% to 5%, wherein an extension percentage in a direction of applying a load is 5% to 30% when the load is applied at 340N/5 cm in parallel to the one yarn, wherein the elastic yarn comprises a core component and a sheath component of monofilament having fusion-bonded intersections, the core component is made of a polyester-based elastomer having a melting point of 190° C. to 250° C., and the sheath component is made of a polyester-based elastomer having a melting point of 140° C. to 190° C.

2. The stretch fabric according to claim 1, wherein the extension percentage in the direction of applying the load is 8% to 20%.

3. The stretch fabric according to claim 1, wherein a residual strain in the direction of applying the load is 3% or less after being extended at a constant speed as repeating a loading and an unloading 300,000 times at 340N/5 cm.

4. A seat comprising, at least in a part, the stretch fabric according to claim 1.

* * * * *